United States Patent [19]

Austin et al.

[11] Patent Number: 4,857,583
[45] Date of Patent: Aug. 15, 1989

[54] PROCESS FOR THE PREPARATION OF ORGANOPOLYSILOXANE SURFACTANTS

[75] Inventors: Paul E. Austin, Williamstown; David D. Farris; James D. Reedy, both of Marietta, all of Ohio; Charles H. Blevins, Beacon; Philbert E. Ramdatt, New York, both of N.Y.

[73] Assignee: Union Carbide Corporation, Danbury, Conn.

[21] Appl. No.: 69,527

[22] Filed: Jul. 2, 1987

[51] Int. Cl.$^4$ .............................................. C08Y 5/06
[52] U.S. Cl. ...................................... 524/761; 524/765; 528/15; 528/31; 528/25; 528/29; 556/401; 556/445; 556/446
[58] Field of Search ...................... 556/446, 445, 401; 528/15, 31, 29, 25; 524/761, 765

[56] References Cited

U.S. PATENT DOCUMENTS

| | | | |
|---|---|---|---|
| 3,402,192 | 9/1968 | Haluska | 260/448.2 |
| 3,518,288 | 6/1970 | Haluska | 260/448.2 |
| 3,629,308 | 12/1971 | Bailey et al. | 260/448.2 |
| 3,980,688 | 9/1976 | Litteral et al. | 260/448.2 |
| 4,122,029 | 10/1978 | Gee et al. | 252/309 |
| 4,520,160 | 5/1985 | Brown | 524/765 |

Primary Examiner—Melvyn I. Marquis
Attorney, Agent, or Firm—Paul W. Leuzzi

[57] ABSTRACT

An improved process is provided for the preparation of siloxane-oxyalkylene block copolymer surfactant compositions which utilized a hydrosilation reaction with high boiling point polar polyols as the reaction solvent. The reaction solvent need not be removed from the block copolymer, particularly when the block copolymer is used as a surfactant for polyurethane foam formulations. Dipropylene glycol is the preferred polar solvent and when used in the preparation of the surfactants need not be removed when the surfactants are employed in the preparation of urethane foams.

16 Claims, No Drawings

PROCESS FOR THE PREPARATION OF ORGANOPOLYSILOXANE SURFACTANTS

FIELD OF THE INVENTION

This invention relates in general to an improved process for the preparation of organopolysiloxane surfactants. In one aspect, this invention is directed to a process for the preparation of improved siloxane-oxyalkylene copolymer compositions. In a further aspect, the invention is directed to siloxane-oxyalkylene copolymers that are suitable for use as surfactants in urethane foam applications.

BACKGROUND OF THE INVENTION

The preparation of siloxane-oxyalkylene copolymers by the hydrosilation reaction of an organohydrogensiloxane and an olefinically substituted polyoxyalkylene is well known and reported in the literature. The hydrosilation reaction is typically performed in a low molecular weight volatile hydrocarbon solvent such as benzene, toluene, xylene or isopropanol so as to aid in handling the reactants, to moderate an exothermic reaction or to promote the solubility of the reactants.

Less typically, the hydrosilation reaction between the organohydrogenpolysiloxane reactant and the olefinically substituted polyoxyalkylene reactant may be conducted without a solvent such as disclosed in U.S. Pat. No. 3,980,688 or conducted in an oxygen containing solvent such as an ether, a polyether, or a lower or higher molecular weight alcohol.

For instance, U.S. Pat. Nos. 3,280,160 and 3,401,192 disclose the preparation of copolymers in n-butylether and in a 50/50 mixture of isopropyl alcohol/toluene, respectively. Also in U.S. Pat. No. 4,122,029 the use of isopropyl alcohol is disclosed and in U.S. Pat. No. 3,518,288 the patentee teaches the use of n-propanol/toluene as a suitable solvent for the preparation of siloxane-oxyalkylene copolymers.

In the majority of the aforementioned processes, the hydrocarbon solvent is removed after the hydrosilation reaction is completed, since in most cases, the solvent is too flammable, toxic or otherwise detrimental to the final product or further processing steps in which the copolymer is utilized. Thus, in the processes disclosed in most of the above patents the solvent was removed from the reaction product after completion of the hydrosilation. A few instances have been reported in the literature where for one reason or another it was not necessary nor desirable to separate the copolymer from the reaction medium. For example, U.S. Pat. No. 4,520,160 disclosed the use of saturated higher alcohols as a reaction solvent which purposely need not be removed from the resulting copolymer when it is used subsequently in personal care compositions as emulsifiers.

U.S. Pat. No. 3,629,308 also disclosed the use of polyethers having a formula $R'O(C_3H_8O)_xH$ where $R'$ is a lower alkyl group and x has a value of from 1 to 20 as a suitable solvent for the preparation of copolymers. When the resulting siloxane-oxyalkylene is to be used as a stabilizer for urethane foams, the patent teaches that it is not necessary to isolate the copolymer from the solvent but rather to use it as a solution.

In many instances, however, the solvent does not enter into any further reactions but remains in the final product as is, and hence there is no need for its removal if it does not adversely affect the product. Thus, in some products, such as personal care products it may even be beneficial to have some of the solvent present in the final product. However, if the copolymer is to undergo further reactions before preparation of the final product is complete, its presence might adversely affect such reactions and hence its removal after the hydrosilation step is desired. For example, if one were to use copolymers containing monohydric higher alcohols in urethane foam applications, these alcohols will enter into the urethane reaction and act as reaction chain terminators in a detrimental fashion because they contain only one hydroxyl group. Also as previously indicated, such solvents may be toxic or otherwise undesirable in further processing of the copolymer.

It is therefore an object of the present invention to provide an improved process for the preparation of siloxane-oxyalkylene copolymers. Another object of this invention is to provide a process for the preparation of siloxane-oxyakylene copolymers which are useful in the formulation of urethane foams and wherein it is not necessary to remove the reaction solvent. A further object of the invention is to provide a process for the preparation of urethane foams which have improved flow properties and other desirable features. These and other objects will readily become apparent to those skilled in the art in the light of the teachings contained herein.

SUMMARY OF THE INVENTION

In its broad aspect, the present invention is directed to an improved process for the preparation of siloxane-oxyalkylene copolymers, their use as surfactants in the preparation of urethane foams, and the resulting foams obtained therefrom.

These copolymers are prepared by a hydrosilation reaction between an organohydrogenpolysiloxane and an olefinically substituted polyoxyalkylene, in the presence of a polar high boiling point polyol containing more than one hydroxyl group and, optionally, in the presence of a carboxylic acid salt. The saturated polar high boiling point polyol and carboxylic acid salt not only aid in the preparation of the copolymer, but if left in the copolymer, aid in the subsequent handling and serve as a necessary component of a composition containing the siloxane-oxyalkylene copolymer.

The process of the present invention comprises the steps of:
(1) forming a mixture of:
 (a) an organohydrogensiloxane having the average formula:

(b) a polyoxyalkylene having the average formula:

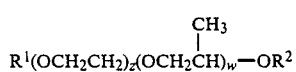

wherein R, R1 and R2 are as hereinafter indicated,
 (c) a liquid, saturated, polar, high boiling point, polyol solvent, and
 (d) optionally a carboxylic acid salt reaction promoter,
(2) maintaining the mixture in an inert atmosphere to a temperature which does not exceed the temperature at which the organohydrogensiloxane reacts with the solvent, (3) adding to said heated mixture, a catalytic amount of a noble metal hydrosilation catalyst, (4) maintaining the temperature of said mixture below about 92° C., and (5) recovering said surfactant in admixture with residual polyol solvent.

DETAILED DESCRIPTION OF THE INVENTION

As indicated above, the present invention provides an improved process for the preparation of organosiloxane copolymer surfactants which are particularly useful in the preparation of urethane foams. The process involves the hydrosilation reaction of an organohydrogenpolysiloxane and an olefinically substituted polyoxyalkylene, in the presence of a polar high boiling point polyol containing more than one hydroxyl group, and optionally in the presence of a carboxylic acid salt. The saturated polar high boiling point polyol and carboxylic acid salt not only aid in the preparation of the siloxane-oxyalkylene copolymer, but the former when left in the copolymer, aids in the subsequent handling and serve as a necessary component of a composition containing the siloxane-oxyalkylene copolymer, particularly when such copolymers are used as surfactants in the preparation of urethane foams.

The organohydrogensiloxane compounds employed in the present invention for the preparation of the surfactants are those represented by the formula:

$$R_aH_bSiO_{(4-a-b)/2}$$

wherein R denotes a monovalent hydrocarbon radical free of aliphatic unsaturation, a has a value of from 1 to 3.0, b has a value of from 0 to 1 and the sum of a+b has a value of from 1.0 to 3.0. The organohydrogenpolysiloxane can contain any combination of siloxane units selected from the group consisting of $R_3SiO_{\frac{1}{2}}$, $R_2HSiO_{\frac{1}{2}}$, $R_2SiO_{2/2}$, $RHSiO_{2/2}$, $RSiO_{3/2}$, $HSiO_{3/2}$ and $SiO_{4/2}$ provided, of course, that the organhydrogenpolysiloxane contains sufficient R-containing siloxane units to provide from about 1 to about 3.0 R radicals per silicone atom and sufficient H-containing siloxane units to provide from 0.01 to 1 silicon-bonded hydrogen atoms per silicon and a total of R radicals and silicon-bonded hydrogen atoms of from 1.5 to 3.0 per silicon. The R-R₃ groups represent hydrocarbon radicals.

Illustrative of suitable R radicals are alkyl radicals such as methyl, ethyl, propyl, butyl, decyl and cycloaliphatic radicals such as cyclohexyl and cyclooctyl, aryl radicals such as phenyl, tolyl, and xylyl. R typically is the methyl radical. The olefinically substituted polyoxyalkylene reactant which can be employed in the process of this invention has the formula:

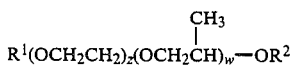

$$R^1(OCH_2CH_2)_z(OCH_2CH)_w{-}OR^2$$
$$\phantom{R^1(OCH_2CH_2)_z(OCH_2}|\phantom{)_w{-}OR^2}$$
$$\phantom{R^1(OCH_2CH_2)_z(OCH_2}CH_3$$

wherein $R^1$ denotes an alkylene group containing from 3 to 6 carbon atoms; $R^2$ is selected from the group consisting of hydrogen an alkyl group containing one to five carbon atoms, an acyl group containing 2 to 5 carbon atoms or a trialkylsilyl group, preferably $R^2$ is hydrogen or methyl group or acetyl group. Z has a value of 0 to 70 and w has a value of 0 to 120. The olefinically substituted polyoxyalkylene may be a blocked or randomly distributed copolymer.

In contrast to the prior art processes, the present invention utilizes a liquid saturated, polar, high boiling point polyol solvent in which the hydrosilation reaction is conducted and which need not be removed from the reaction mixture, particularly when the copolymer reaction product is subsequently used in the preparation of urethane foams.

The particular solvents which are employed in the present invention are saturated polyols containing at least about 4 carbon atoms, two or more hydroxyl groups, which have a boiling point of greater than 175° C. at atmospheric pressure and which meet the definition defined by the formula below. The solvents are inert to the reactants and are essentially non-toxic. These solvents are for the most part composed only of carbon, hydrogen and oxygen and are aliphatic, cycloaliphatic or aromatic polyols. The polar solvents of the present invention can be defined by the following equation:

$$H + \frac{E}{5.76} \geqq 0.17$$

wherein:

H=weight fraction of hydroxyl (OH) in the solvent molecule.

E=weight fraction of ethylene oxide units (CH₂CH₂O) in the solvent.

Illustrative polar, high boiling solvents which can be used in the practice of the present invention, include, but are not limited to, the glycols, such as, diethylene glycol, 3-hydroxypropyl ether, diisopropylene glycol, dibutylene glycol, di-tertiary butylene glycol, 1,6-dihydroxymethyl-cyclohexane, 1,6-dihydroxymethoxy-cyclohexane, 1,4-dihydroxyethoxy-cyclohexane, 1,6-dihydroxymethyl benzene, 1,4-dihydroxyethoxy benzene, and the like. The preferred polyol for use in the process of the present invention is dipropylene glycol.

As indicated above, it is important that the polyol have a boiling point greater than about 175° C.

As previously indicated, the hydrosilation reaction is conducted in the presence of a noble metal hydrosilation catalyst. Thus, the hydrosilation reaction between the organohydrogenpolysiloxane and an olefinically substituted polyoxyalkylene reactant is facilitated by using a catalytic amount of a noble metal-containing catalyst. Such catalysts are well known and include platinum, palladium and rhodium-containing catalysts. Chloroplatinic acid is particularly preferred.

The catalyst is employed in an catalytic amount sufficient to promote the hydrosilation reaction. In practice the amount of catalyst will usually be within the range of from about 1 to about 100 ppm of noble metal based on the total parts of the mixture of reactants and solvent.

The hydrosilation reaction, as previously noted, can be optionally conducted in the presence of salts of carboxylic acids as promoters, and which can be present when using polar solvents for the hydrosilation of polyethers with organohydrogenpolysiloxanes. A low, but sometimes adequate level of carboxylic acid salts may already be present in olefinically substituted polyoxyalkylenes due to inadvertent exposure to traces of oxygen during subsequent capping of hydroxyl groups with allylic, methyl or acyl groups. In such instances, the use of the acid salt may not be necessary. However, it has been noted that if the polyoxyalkylene reactant is free of oxidation by-products, the use of a promoter is necessary in conjunction with the high boiling polyol if an efficient and rapid reaction of the ogranohydrogenpolysiloxane and polyoxalkylene reactant is to occur. These promoters can be represented by the formula:

$$RCO_2M$$

wherein M is H, alkali or alkaline earth metals or alternately ammonium or phosphonium salts and R represents a monovalent hydrocarbon group of from 2 to 20 carbon atoms. The preferred carboxylic acids contain 3 or more carbon atoms and are composed of carbon, hydrogen and oxygen. Particularly preferred are the monocarboxylic acids containing from about 3 to about 20 carbon atoms. Due to traces of carboxylic acid impurities in the polyoxyalkylenes it is sometimes only necessary to add some source of M as an amine or weak base such as sodium bicarbonate to achieve the desired effect. The promoter level needs to be at least about 100 ppm and typically at about 0.1 weight percent of reactants. Concentrations of from about 100 ppm to about 10,000 ppm can also be employed and the actual amount will be dependent to some degree on the particular acid salt employed.

By conducting the hydrosilation reaction in the manner indicated above, and employing the saturated high boiling point polyol and carboxylic acid salt, improvements are obtained in one or more aspects of the reaction, such as reaction rate, reaction yield, reaction selectivity, reaction processes or reaction product processing in urethane foam applications. For example, when dipropylene glycol is used it has been found that the use of at least 10 percent by weight, based on the weight of the reactants, of the polyol and 0.05 percent of an acid salt such as sodium oleate will aid in the handling of the reactants and moderate the reaction exotherms. Of course, amounts of saturated polar high boiling polyol larger than 10 percent can be used and greater than 0.05 percent of the sodium oleate can be used if desired. In general, from 5 to about 35 weight percent and more preferably from about 15 to about 25 weight percent of the polyol have been found to give good results.

The organopolysiloxane surfactants prepared by the process of the present invention are particularly useful and have been found to be excellent and efficient surfactants for the preparation of flexible polyether polyurethane foams. It has been found that the surfactants of this invention provide improved levels of performance to polyurethane foams and avoid the necessity of solvent removal from the reaction mixture in which the organopolysiloxane was prepared. Since a relatively non-toxic solvent is used and its removal from the reaction mixture avoided, the surfactants are prepared under desirable environmental conditions.

In producing the polyurethane foams using the surfactants of this invention, one or more polyether polyols is employed for reaction with the polyisocyanate reactant to provide the urethane linkage. Such polyols have an average of at least two, and typically 2.0 to 3.5, hydroxyl groups per molecule and include compounds which consist of carbon, hydrogen and oxygen and compounds which may also contain phosphorus, halogen, and or nitrogen. Such polyether polyols are well known in the art and are commercially available.

The organic polyisocyanates that are useful in producing flexible polyether polyurethane foams in accordance with the process of this invention are also well known in the art and are organic compounds that contain at least two isocyanate groups and any such compounds or mixtures thereof can be employed. The toluene diiisocyanates are among many suitable isocyanates which are commercially used in the preparation of foams.

The urethane-foaming reaction is usually effected in the presence of a minot amount of a catalyst, preferably an amine catalyst and usually a tertiary amine.

It is also preferred to include a minor amount of certain metal catalysts in addition to the amine catalyst in the component of the reaction mixture. Such supplementary catalysts are well known to the art of flexible polyether-based polyurethane foam manufacture. For example, useful metal catalysts include organic derivatives, of tin, particularly tin compounds of carboxylic acids such as stannous octoate, stannous oleate and the like.

Foaming is accomplished by employing a small amount of a polyurethane blowing agent such as water in the reaction mixture, which upon reaction with isocyanate generates carbon dioxide in situ, or through the use of blowing agents which are vaporized by the exotherm of the reaction or by a combination of the two. These methods are well known in the art.

The polyether-based polyurethane foams of this invention may be formed in accordance with any of the processing techniques known to the art such as, in particular, the "one-shot" technique. In accordance with this method, foamed products are provided by carrying out the reaction of the polyisocyanate and polyether polyol simultaneously with the foaming operation. It is sometimes convenient to add the surfactant to the reaction mixture as a premixture with one or more of the blowing agents, polyether, polyol and catalyst components.

It is understood that the relative amounts of the various components of the foam formulation are not narrowly critical. The polyether polyol and polyisocyanate are present in the foam-producing formulation in a major amount. The relative amounts of these two components in the amount required to produce the desired urethane structure of the foam and such relative amounts are well known in the art. The blowing agent, catalyst and surfactant are each present in a minor amount necessary to achieve the function of the component. Thus, the blowing agent is present in an amount sufficient to foam the reaction mixture, the catalyst is present in a catalytic amount which is that amount necessary to catalyze the reaction to produce the urethane at a reasonable rate, and the surfactant is an amount sufficient to impart the desired properties as indicated in Tables I and II below.

The polyurethanes produced in accordance with the present invention can be used in the same areas as conventional flexible polyether polyurethanes. For example, the foams of the present invention can be used with advantage in the manufacture of textile interliners, cushions, mattresses, padding, carpet underlay, packaging, gaskets, sealers, thermal insulators and the like.

The following examples illustrate the best mode presently contemplated for the practice of this invention.

Examples 1–4 below, employed one set of polyethers and were carbon treated prior to use in order to demonstrate the production of surfactants in a polar high boiling point polyol solvent without the presence of carboxylic acid salts. As the solvent level increased beneficial increase in foam air flow is obtained. The results are summarized in Table I.

EXAMPLE 1

A well stirred mixture of 145.6 grams of an olefinically substituted carbon treated polyoxyalkylene having the average formula $CH_2=CHCH_2O(CH_2CH_2O)_{18}(CH_2CHCH_3O)_{20.7}OCCH_3$, 34.4 grams of an organohydrogen polysiloxane having the average formula $Me_3SiO(Me_2SiO)_{60}(MeHSiO)_7SiMe_3$ and 20 grams (10 wt %) of dipropylene glycol was degassed by nitrogen sparge and heated to 85° C. A solution of $H_2PtCl_6.6H_2O$ in ethanol was added to the mixture in sufficient amount to provide 15 ppm Pt. The heat source was removed and the exothermic hydrosilation reaction was allowed to proceed until no further temperature increase was noted. Heat was then added to the mixture as needed to keep its temperature at 85° C. for 15 minutes. Care was taken never to allow the reaction pot to exceed 94° C. A siloxaneoxyalkylene copolymer containing no gel particles was obtained The copolymer was then back diluted to a total of 40 weight percent with dipropylene glycol and a resulting viscosity of 686 cSt was obtained.

EXAMPLE 2

A well stirred mixture of 129 grams of an olefinically substituted carbon treated polyoxyalkylene having the average formula $CH_2=CHCH_2O(CH_2CH_2O)_{18}(CH_2CHCH_3O)_{20.7}OCCH_3$, 30.6 grams of an organohydrogen polysiloxane having the average formula $Me_3SiO(Me_2SiO)_{60}(MeHSiO)_7SiMe_3$ and 40 grams (20 wt %) of dipropylene glycol was degassed by nitrogen sparge and heated to 85° C. A solution of $H_2PtCl_6H_2O$ in ethanol was added to the mixture in sufficient amount to provide 15 ppm Pt. The heat source was removed and the exothermic hydrosilation reaction was allowed to proceed until no further temperature increase was noted. Heat was then added to the mixture as needed to keep its temperature at 80° C. for 1 hour. Care was taken never to allow the reaction pot to exceed 91° C. A siloxane-oxyalkylene copolymer containing no gel particles was obtained. The copolymer was then back diluted to a total of 40 weight percent with dipropylene glycol and the resulting viscosity of 642 cSt was obtained.

EXAMPLE 3

A well stirred mixture of 113.2 grams of an olefinically substituted carbon treated polyoxyalkylene having the average formula $CH_2=CHCH_2O(CH_2CH_2O)_{18}(CH_2CHCH_3O)_{20.7}OCCH_3$, 26.8 grams of an organohydrogen polysiloxane having the average formula $Me_3SiO(Me_2SiO)_{60}(MeHSiO)_7SiMe_3$ and 60 grams (30 wt %) of dipropylene glycol was degassed by nitrogen sparge and heated to 85° C. A solution of $H_2PtCl_6.H_2O$ in ethanol was added to the mixture in sufficient amount to provide 15 ppm Pt. The heat source was removed and the exothermic hydrosilation reaction was allowed to proceed until no further temperature increase was noted. Heat was then added to the mixture as needed to keep its temperature at 85° C. for 15 minutes. Care was taken never to allow the reaction pot to exceed 92° C. A siloxaneoxyalkylene copolymer containing no gel particles was obtained. The copolymer was then, back diluted to a total of 40 weight percent with dipropylene glycol and the resulting viscosity of 638 cSt was obtained.

EXAMPLE 4

A well stirred mixture of 97.1 grams of an olefinically substituted carbon treated polyoxyalkylene having the average formula $CH_2=CHCH_2O(CH_2CH_2O)_{18}(CH_2CHCH_3O)_{20.7}OCCH_3$, 23 grams of an organohydrogen polysiloxane having the average formula $Me_3SiO(Me_2SiO)_{60}(MeHSiO)_7SiMe_3$ and 60 grams 40 wt %) of dipropylene glycol was degassed by nitrogen sparge and heated to 85° C. A solution of $H_2PtCl_6.H_2O$ in ethanol was added to the mixture in sufficient amount to provide 15 ppm Pt. The heat source was removed and the exothermic hydrosilation reaction was allowed to proceed until no further temperature increase was noted. Heat was then added to the mixture as needed to keep its temperature at 80° C. for 1 hour. Care was taken never to allow the reaction pot to exceed 91° C. A siloxane-oxyalkylene copolymer containing no gel particles was obtained. The copolymer was then back diluted to a total of 40 weight percent with dipropylene glycol and the resulting viscosity of 603 cSt was obtained.

In Examples 5-12 below, the experiments were performed with a second lot of polyethers and demonstrate the benefits of carboxylic acid salts. Example 5 has no carboxylic acid salt present and possesses low air flow. The presence of carboxylic salt from oxidation of polyethers is present in Example 6 and the resulting surfactant affords higher air flow as summarized in Table II.

EXAMPLE 5

A well stirred mixture of 111.1 grams of an olefinically substituted carbon treated polyoxyalkylene having the average formula $CH_2=CHCH_2O(CH_2CH_2O)_{17.3}(CH_2CHCH_3O)_{19.7}OCCH_3$, 29.0 grams of an organohydrogen polysiloxane having the average formula $Me_3SiO(Me_2SiO)_{60}(MeHSiO)_7SiMe_3$ and 60 grams (30 wt %) of dipropylene glycol was degassed by nitrogen sparge and heated to 75° C. A solution of $H_2PtCl_6.H_2O$ in ethanol was added to the mixture in sufficient amount to provide 15 ppm Pt. The heat source was removed and the exothermic hydrosilation reaction was allowed to proceed until no further temperature increase was noted. Heat was then added to the mixture as needed to keep its temperature at 80° C. for 15 minutes. Care was taken never to allow the reaction pot to exceed 81° C. A siloxaneoxyalkylene copolymer containing no gel particles was obtained. The copolymer was then back diluted to a total of 30 weight percent with dipropylene glycol and the resulting viscosity of 703 cSt was obtained.

EXAMPLE 6

A well stirred mixture of 111.1 grams of an olefinically substituted carbon treated polyoxyalkylene having the average formula $CH_2=CHCH_2O(CH_2CH_2O)_{17.3}(CH_2CHCH_3O)_{19.7}OCCH_3$, 29.0 grams of an organohydrogen polysiloxane having the average formula $Me_3SiO(Me_2SiO)60(MeHSiO)_7SiMe_3$ and 60 grams (30 wt %) of dipropylene glycol was degassed by nitrogen sparge and heated to 80° C. A solution of $H_2PtCl_6.H_2O$ in ethanol was added to the mixture in sufficient amount to provide 15 ppm Pt. The heat source was removed and the exothermic hydrosilation reaction was allowed to proceed until no further temperature increase was noted. Heat was then added to the mixture as needed to keep its temperature at 80° C. for 15 minutes. Care was taken never to allow the reaction pot to exceed 91° C. A siloxane-oxyalkylene copolymer containing no gel particles was obtained. The copolymer was then back diluted to a total of 30 weight percent with dipropylene glycol and the resulting viscosity of 807 cSt was obtained.

Examples 7-9 which follow, demonstrate the clear benefits of the back addition of carboxylic acid salts to systems employing treated polyethers Increased flows are obtained while retaining normal potency. Example 9 demonstrates that carboxylic acid salts with less than 3 carbon atoms are not as effective as those containing greater than 3 carbon atoms in that examples 7 and 8 possess normal potency and increased air flows over that of example 9.

EXAMPLE 7

A well stirred mixture of 111.1 grams of an olefinically substituted carbon treated polyoxyalkylene having the average formula $CH_2=CHCH_2O(CH_2CH_2O)_{17.3}(CH_2CHCH_3O)_{19.7}OCCH_3$, 29.0 grams of an organohydrogen polysiloxane having the average formula $Me_3SiO(Me_2SiO)_{60}(MeHSiO)_7SiMe_3$ and 60 grams (30 wt %) of dipropylene glycol and 0.11 grams of the carboxylic acid salt sodium oleate was degassed by nitrogen sparge and heated to 75° C. A solution of $H_2PtCl_6.H_2O$ in ethanol was added to the mixture in sufficient amount to provide 15 ppm Pt. The heat source was removed and the exothermic hydrosilation reaction was allowed to proceed until no further temperature increase was noted. Heat was then added to the mixture as needed to keep its temperature at 80° C. for 15 minutes. Care was taken never to allow the reaction pot to exceed 81° C. A siloxane-oxyalkylene copolymer containing no gel particles was obtained. The copolymer was then back diluted to a total of 30 weight percent with dipropylene glycol and the resulting viscosity of 839 cSt was obtained.

EXAMPLE 8

A well stirred mixture of 111.1 grams of an olefinically substituted carbon treated polyoxyalkylene having the average formula $CH_2=CHCH_2O(CH_2CH_2O)_{17.3}(CH_2CHCH_3O)_{19.7}OCCH_3$, 29.0 grams of an organohydrogen polysiloxane having the average formula $Me_3SiO(Me_2SiO)_{60}(MeHSiO)_7SiMe_3$ and 60 grams (30 wt %) of dipropylene glycol and 0.11 grams of the carboxylic acid salt sodium butylate was degassed by nitrogen sparge and heated to 75° C. A solution of $H_2PtCl_6.H_2O$ in ethanol was added to the mixture in sufficient amount to provide 15 ppm Pt. The heat source was removed and the exothermic hydrosilation reaction was allowed to proceed until no further temperature increase was noted. Heat was then added to the mixture as needed to keep its temperature at 80° C. for 15 minutes. Care was taken never to allow the reaction pot to exceed 80° C. A siloxane-oxyalkylene copolymer containing no gel particles was obtained. The copolymer was then back diluted to a total of 30 weight percent with dipropylene glycol and the resulting viscosity of 851 cSt was obtained.

EXAMPLE 9

A well stirred mixture of 111.1 grams of an olefinically substituted carbon treated polyoxyalkylene having the average formula $CH_2=CHCH_2O(CH_2CH_2O)_{17.3}(CH_2CHCH_3O)_{19.7}OCCH_3$, 29.0 grams of an organohydrogen polysiloxane having the average formula $Me_3SiO(Me_2SiO)_{60}(MeHSiO)_7SiMe_3$ and 60 grams (30 wt %) of dipropylene glycol and 0.11 grams of the carboxylic acid salt potassium acetate was degassed by nitrogen sparge and heated to 75° C. A solution of $H_2PtCl_6.H_2O$ in ethanol was added to the mixture in sufficient amount to provide 15 ppm Pt. The heat source was removed and the exothermic hydrosilation reaction was allowed to proceed until no further temperature increase was noted. Heat was then added to the mixture as needed to keep its temperature at 80° C. for 15 minutes. Care was taken never to allow the reaction pot to exceed 80° C. A siloxane-oxyalkylene copolymer containing no gel particles was obtained. The copolymer was then back diluted to a total of 30 weight percent with dipropylene glycol and the resulting viscosity of 875 cSt was obtained.

In examples 10 through 12 which follow, the reactions were carried out either in polar low boiling solvents (IPA) or non polar solvents (toluene). Although normal surfactant may be made in toluene solvent, the solvent is volatile and requires removal to increase the resulting copolymer's flash point for safety considerations.

EXAMPLE 10

A well stirred mixture of 111.1 grams of an olefinically substituted carbon treated polyoxyalkylene having the average formula $CH_2=CHCH_2O(CH_2CH_2O)_{17.3}(CH_2CHCH_3O)_{19.7}OCCH_3$, 29.0 grams of an organohydrogen polysiloxane having the average formula $Me_3SiO(Me_2SiO)_{60}(MeHSiO)_7SiMe_3$ and 60 grams (30 wt %) of toluene was degassed by nitrogen sparge and heated to 80° C. A solution of $H_2PtCl_6.H_2O$ in ethanol was added to the mixture in sufficient amount to provide 15 ppm Pt. The heat source was removed and the exothermic hydrosilation reaction was allowed to proceed until no further temperature increase was noted. Heat was then added to the mixture as needed to keep its temperature at 80° C. for 15 minutes. Care was taken never to allow the reaction pot to exceed 90° C. A siloxaneoxyalkylene copolymer containing no gel particles was obtained. The copolymer was then back diluted to a total of 30 weight percent with dipropylene glycol and the resulting viscosity of 880 cSt was obtained.

Examples 11 and 12 demonstrate the need for beneficial amounts of carboxylic acid salts in polar solvents such as IPA. However, isopropanol solvent also requires removal prior to use due to low flash point safety concerns.

EXAMPLE 11

A well stirred mixture of 111.1 grams of an olefinically substituted carbon treated polyoxyalkylene having the average formula $CH_2=CHCH_2O(CH_2CH_2O)_{17.3}(CH_2CHCH_3O)_{19.7}OCCH_3$, 29.0 grams of an organohydrogen polysiloxane having the average formula $Me_3SiO(Me_2SiO)_{60}(MeHSiO)_7SiMe_3$ and 60 grams (30 wt %) of isopropanol and 0.12 grams of sodium butyrate was degassed by nitrogen sparge and heated to 75° C. A solution of $H_2PtCl_6.H_2O$ in ethanol was added to the mixture in sufficient amount to provide 15 ppm Pt. The heat source was removed and the exothermic hydrosilation reaction was allowed to proceed until, no further temperature increase was noted. Heat was then added to the mixture as needed to keep its temperature at 75° C. for 15 minutes. Care was taken never to allow the reaction pot to exceed 79° C. A siloxane-oxyalkylene copolymer containing no gel particles was obtained. The copolymer was then stripped to remove isopropanol (IPA). The resulting neat copolymer possessed a viscosity of 1715 cSt.

EXAMPLE 12

A well stirred mixture of 127.5 grams of an ion exchanged olefinically substituted carbon treated polyoxyalkylene having the average formula $CH_2=CHCH_2O(CH_2CH_2O)_{17.3}(CH_2CHCH_3O)_{19.7}OCCH_3$, 32.5 grams of an organohydrogen polysiloxane having the average formula $Me_3SiO(Me_2SiO)_{60}(MeHSiO)_7SiMe_3$ and 40 grams (20 wt %) of isopropanol was degassed by nitrogen sparge and heated to 65° C. A solution of $H_2PtCl_6.H_2O$ in ethanol was added to the mixture in sufficient amount to provide 45 ppm Pt. The heat source was removed and the exothermic hydrosilation reaction was allowed to proceed until no further temperature increase was noted. Heat was then added to the mixture as needed to keep its temperature at 65° C. for 15 minutes. Care was taken never to allow the reaction pot to exceed 70° C. A siloxaneoxyalkylene copolymer containing no gel particles was obtained. The copolymer was then stripped to remove isopropanol (IPA). The resulting neat copolymer possessed a viscosity of 1372 cSt.

The above-prepared reaction products were evaluated as surfactants in a polyurethane foam composition in the following manner:

A mixture of 100 parts of a polyol base, 1.26 parts of the above surfactant (not counting dipropylene glycol) and 0.23 parts of stannous octoate, 0.2 parts A-200, 5.5 parts water, and 10 parts methylene chloride were thoroughly mixed. To the above mixture was added 112 Index of toluene diisocyanate and the resulting mixture was mixed for 7 seconds and then poured into a plastic bucket. The mixture was allowed to foam and rise to maximum height and was then cured at 110° C. for 10 minutes.

The cured foam was evaluated by measuring foam height, air flow through the foam and foam cell quality in a well known manner. The results are shown in Tables I and II below. It is evident from the data presented that the surfactant made by the improved method of this invention was equal or superior to the surfactant made in toluene solvent without carboxylic acid salt, according to one or more test criteria.

TABLE I

| Surfactant Foam Example # | Surfactant Solvent Amount[1] | Identity[2] | Carboxylic Acid Salt 0.1%[3] | Foam Height[4] | Airflow[5] | Foam Cell Uniformity[6] |
|---|---|---|---|---|---|---|
| 1 | 10 | DPG | None | 39.5 | 1.4 | 7 |
| 2 | 20 | DPG | None | 38.0 | 2.3 | 5 |
| 3 | 30 | DPG | None | 39.5 | 3.0 | 8 |
| 4 | 40 | DPG | None | 39.0 | 3.5 | 6 |

[1]Weight percent of polysiloxane + polyoxyalkleneoxide
[2]DPG is dipropylene glycol
[3]Polyethers were carbon treated to remove any carboxylic acid oxidation products except Example #6 wherein IR confirmed presence of oxidation products.
[4]Centimeters ± 0.5
[5]ft³/Min. ± 0.2, higher airflow more desirable
[6]Visual rating lower values more desirable, scale 1 to 12

TABLE II

| Surfactant Foam Example # | Surfactant Solvent Amount[1] | Identity[2] | Carboxylic Acid Salt 0.1%[3] | Foam Height[4] | Airflow[5] | Foam Cell Uniformity[6] |
|---|---|---|---|---|---|---|
| 5 | 30 | DPG | None | 36.6 | 2.5 | 2 |
| 6 | 30 | DPG | (3) | 39.6 | 3.8 | 3 |
| 7 | 30 | DPG | Sodium Oleate | 38.5 | 5.6 | 5 |
| 8 | 30 | DPG | Sodium Butyrate | 37.5 | 4.9 | 2 |
| 9 | 30 | DPG | Potassium Acetate | 37.3 | 3.6 | 3 |
| 10 | 30 | Toluene | None | 37.5 | 4.2 | 3 |
| 11 | 30 | IPA | Sodium Butyrate | 36.2 | 2.0 | 3 |
| 12 | 20 | IPA | None | 31.0 | 2.2 | 6 |

[1]Weight percent of polysiloxane + polyoxyalkleneoxide
[2]DPG is dipropylene glycol
[3]Polyethers were carbon treated to remove any carboxylic acid oxidation products except Exmple #6 wherein IR confirmed presence of oxidation products.
[4]Centimeters ± 0.5
[5]ft³/Min. ± 0.2, higher airflow more desirable
[6]Visual rating lower values more desirable, scale 1 to 12

Although the invention has been illustrated by the preceding examples, it is not to be construed as being limited to the materials employed therein, but rather, the invention is directed to the generic area as hereinbefore disclosed. Various modifications and embodiments can be made without departing from the spirit and scope thereof.

What is claimed is:

1. An improved process for the preparation of organosiloxane copolymer surfactants in a saturated, polar, high boiling point polyol solvent, and wherein said surfactant can be employed directly in the production of urethane foam without the need for removing residual solvent, said process comprising the steps of:
   (1) forming a mixture of:
   (a) an organosiloxane having the average formula:

$R_aH_bSiO_{(4-a-b)/2}$ wherein R represents a monovalent hydrogen radical, a has a value of from 1 to 3.0, b has a value of from 0 to 1, and the sum of a+b has a value of from 1.5 to 3.0;
   (b) a polyoxyalkylene having the average formula $$R^1(OCH_2CH_2)_z(OCH_2\overset{\overset{\displaystyle CH_3}{|}}{CH})_w\!-\!OR^2$$

wherein the ethylene oxide and propylene oxide may be blocked or random and wherein $R^1$ is an alkenyl group; $R^2$ is selected from the group consisting of hydrogen, alkyl, acyl and trialkylsilyl groups; z has a value of from 0 to 70 and w has a value of 0 to 120;

(c) a liquid, saturated, polar, polyol solvent having a boiling point of greater that 175° C., and (d) optionally a salt of a carboxylic acid as a reaction promoter, (2) maintaining said mixture in an inert atmosphere and adding to said mixture a catalytic amount of a noble metal hydrosilation catalyst, (3) reacting the mixture at a temperature below about 92° C. and (4) recovering said surfactant in admixture with residual polyol solvent.

2. The process of claim 1 wherein the temperature in step (3) is form about 70° to about 90° C.

3. The process of claim 1 wherein said liquid, saturated, polar, high boiling point polyol has a boiling point of at least about 175° C.

4. The process of claim 1 wherein said liquid, saturated, polar, high boiling point, polyol solvent is composed of hydrogen, carbon and oxygen.

5. The process of claim 1 wherein said liquid, saturated, polar, high boiling point, polyol solvent is dipropylene glycol.

6. The process of claim 1 wherein said liquid, saturated, polar, high boiling point polyol solvent is present in an amount of from about 5 to about 35 weight percent based on the total weight of said mixture.

7. The process of claim 1 wherein said liquid, saturated, polar, high boiling point polyol solvent is present in an amount of from about 15 to about 25 weight percent based on the total weight of said mixture.

8. The process of claim 1 wherein the organosiloxane is selected from the group consisting of:

$R_3SiO_{\frac{1}{2}}$, $R_2HSiO_{\frac{1}{2}}$, $R_2SiO_{2/2}$, $RHSiO_{2/2}$, $RSiO_{3/2}$, $HSiO_{3/2}$ and $SiO_{4/2}$ wherein $R$-$R_3$ represent a monovalent hydrocarbon radical.

9. The process of claim 1 wherein said reaction promoter has the formula: wherein M represents an alkali or alkaline earth metal and R represents monovalent hydrocarbon.

10. The of claim 1 wherein said reaction promoter has the formula:

$RCO_2M$ wherein M represents an ammonium or phosphonium ion and a represents monovalent hydrocarbon.

11. The process of claim 1 wherein said reaction promoter contains at least 3 carbon atoms and is composed of carbon, hydrogen and oxygen.

12. The process of claim 1 wherein said reaction promoter is sodium oleate.

13. The process of claim 1 wherein said noble metal hydrosilation catalyst is platinum.

14. The process of claim 1 wherein said hydrosilation catalyst is $H_2PtCl_6.H_2O$.

15. The organopolysiloxane surfactant and polyol mixture of claim 1 containing at least 5 weight percent and at least 100 ppm of the reaction promoter of the formula:

$RCO_2M$ wherein R has 2 to 19 carbon atoms and M represents an alkali or alkaline earth metal.

16. The process of claim 1 wherein the polyoxyalkylene has the average formula $CH_2\!=\!CHCH_2O(CH_2CH_2O)_{14\text{-}26}(CH_2CHCH_3O)_{15\text{-}30}OCCH_3$ and the organosiloxane has the average formula $Me_3SiO(Me_2SiO)_{40\text{-}200}(MeHSiO)_{3\text{-}9}SiMe_3$.

* * * * *